Figure 1:
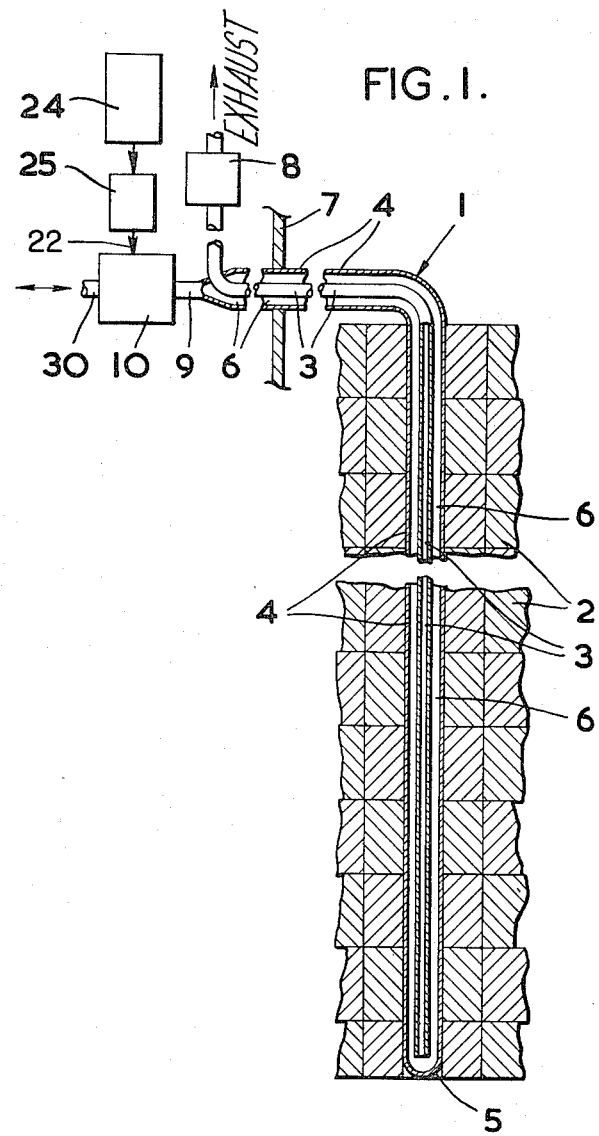

Sept. 21, 1965   R. H. CAMPBELL   3,207,667
METHOD AND APPARATUS TO DETERMINE REACTOR FLUX DISTRIBUTION
Filed June 2, 1960   3 Sheets-Sheet 2

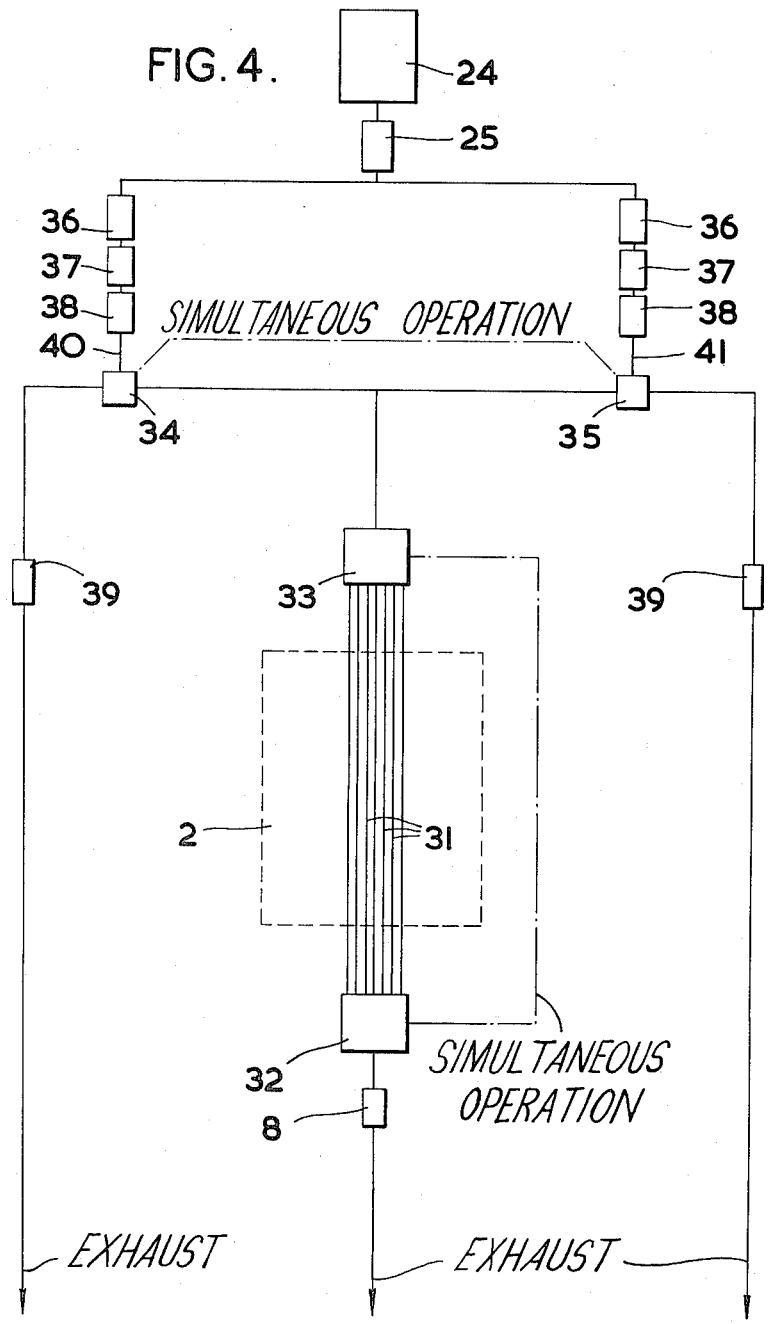

United States Patent Office 3,207,667
Patented Sept. 21, 1965

3,207,667
METHOD AND APPARATUS TO DETERMINE REACTOR FLUX DISTRIBUTION
Ronald Hugh Campbell, Bowden, England, assignor to United Kingdom Atomic Energy Authority, London, England
Filed June 2, 1960, Ser. No. 33,453
Claims priority, application Great Britain, June 12, 1959, 20,181/59
4 Claims. (Cl. 176—19)

This invention relates to nuclear reactors, and in particular to a method of and means for determination of neutron flux distribution in the core of a nuclear reactor (hereinafter referred to as "flux scanning").

In order to obtain a complete picture of flux distribution in the core of a nuclear reactor, both longitudinal and lateral distribution must be determined. Lateral distribution can readily be measured by scanning at different positions across the core. Longitudinal distribution can likewise be measured by scanning at different positions along the length of the core.

Known methods of flux scanning, whilst use for low powered or research reactors, have not been fully proved for operation in highly rated power-producing reactors where the core is at high temperature. These methods include scanning by an ion chamber lowered into an access hole, and scanning by monitoring isotope formation in a wire exposed to irradiation in the core, the produced isotope having a suitable half-life period, and the wire being lowered into an access hole in the core where it undergoes irradiation and is then withdrawn for monitoring. Serious practical problems arise in the use of these methods where determination of a distribution in one direction with respect to the core necessitates using a non-vertical access hole, in particular a horizontal hole where the fuel element channels and control rod holes in the core are vertical, because in the case of ion chamber scanning, the holes need to be of substantial diameter and are difficult to provide, and in the case of wire scanning, lack of gravity feed makes the placing in position of the wire difficult and furthermore rubbing and contamination of the wire makes readings unreliable.

It is an object of the invention to provide a method of and means for flux scanning which is simple, reliable and which can produce readings of both longitudinal and lateral distribution.

According to the invention, a method of nuclear reactor flux distribution scanning comprises the steps of passing a filament of fluid into a passage extending through the core of the reactor, allowing the filament of fluid to remain stagnant in said passage for a period during which it is subjected to irradiation, then removing the filament of fluid from the passage and simultaneously monitoring its activity so as to obtain the distribution of neutron flux in the core.

According to another aspect of the invention, a method of nuclear reactor flux scanning comprises the steps of passing a filament of fluid along a passage extending through the core of the reactor, monitoring its activity at the outlet and so determining the integrated flux through the core, changing the flow rate of the filament of fluid in its passage through the core, continuing to monitor activity at the outlet as the flow rate is changed so as to obtain readings of activity level which are firstly transitional and then steady as the new flow rate becomes established through the core, and then differentiating the transitional readings to obtain the distribution of flux in the core.

Distribution across the core can be obtained by measuring the activity of fluid passed at a steady flow rate through the core at a number of different positions across the core.

Alternatively, lateral distribution may be obtained by either of the said methods by passing the gas laterally across the core.

Differentiation to obtain lateral distribution may be accomplished graphically or mechanically.

Mechanical differentiation may be effected by recording the output of a tachogenerator driven by a motor employed for driving the activity recorder, thereby measuring the rate of change of the readings indicated by the activity recorder.

An embodiment of the invention will now be described by way of example with reference to the accompanying diagrammatic drawings, wherein—

Figure 2:
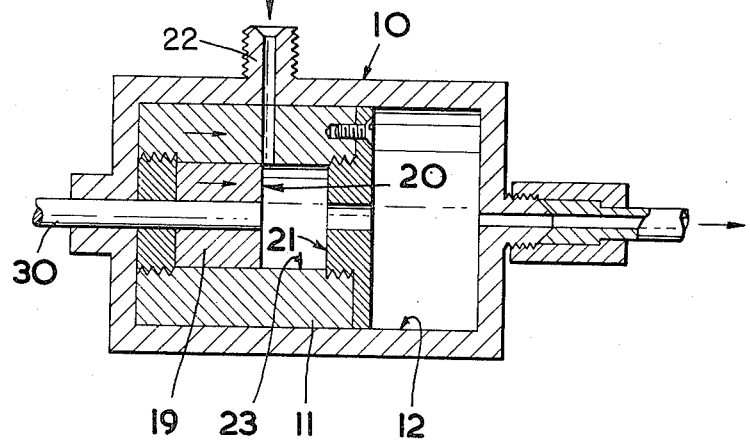
Figure 3:
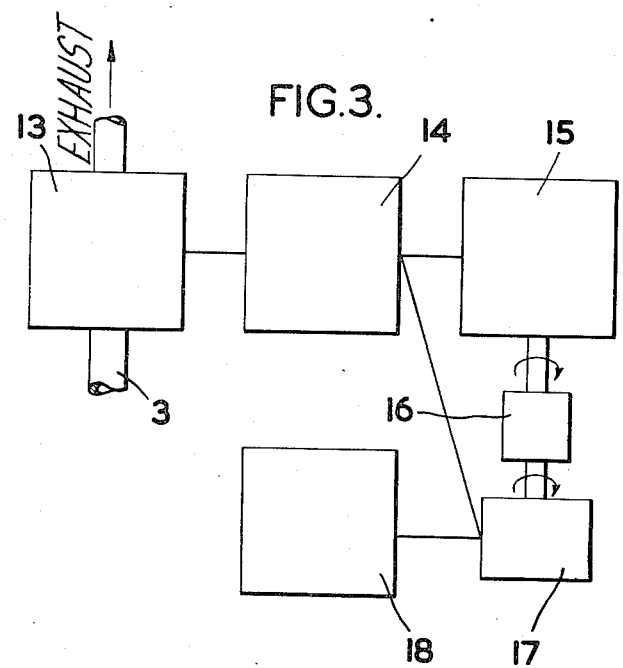

FIGURE 1 is a side view in section,
FIGURE 2 is a side view in medial section of a detail, drawn to a larger scale than that of FIGURE 1,
FIGURE 3 is a flow diagram, and
FIGURE 4 is a flow diagram and illustrates a modification.

Referring to the drawings (wherein like reference numerals indicate like parts), in the construction shown in FIGURES 1 and 2 thereof, as applied by way of example to a gas cooled, graphite moderated nuclear reactor whose core is penetrated by vertical fuel element channels and vertical control rod channels, a series of coaxial small-bore stainless steel pipe units, one of which is shown in FIGURE 1 and designated 1, are disposed each at different radial positions to penetrate the cylindrical core 2 of the nuclear reactor in an axial (i.e., longitudinal) direction, the inner pipe 3 of each unit 1 communicating with the outer pipe 4, which has a closed lower end 5, near the said closed end and providing a re-entrant flow path for gas supplied to the annulus 6 between the two pipes 3 and 4. Each unit 1 projects through the wall of the pressure vessel (part of which is shown in FIGURE 1 and designated 7) in which the core 2 is mounted and each outflow pipe (the inner pipe 3 of each unit 1) is provided with a monitor 8 shown diagrammatically in FIGURE 3 and comprising a counter 13, amplifier 14 and recorder 15 driven by a motor 16. The gas employed is argon, which is suitable for flux scanning because of its inertness, the fact that it consists of 99.6% of the isotope $A^{40}$, its possession of a neutron capture cross-section high enough for good detection but not too high to distort the flux significantly, its absence of very large cross-section resonances, the fact that the isotope produced by neutron irradiation, $A^{41}$, has a half-life of 1.8 hours which gives a useful compromise between a short half life which gives a high count rate and a long half-life which makes the effect of transit time between activation and detection negligible, and the fact that the energy of $\beta$ particles emitted in the decay of $A^{41}$ to its daughter product $K^{41}$ (which is stable) is high.

The gas is supplied to each unit 1 via an inlet 9 by use of an assembly 10 shown in more detail in FIGURE 2 and comprising a piston 11 moved in a cylinder 12 at constant speed, thereby producing a constant flow rate of gas into and to fill the tubes 3 and the annuli 6 of each unit 1. The flow rate is reduced to zero by stopping the piston 11 and the gas is allowed to remain stagnant in the unit 1 for a predetermined period such that it is activated by irradiation sufficiently to give a useful signal on the recorder 15. The gas is now moved out of the core by use of the piston 11 operating at the same speed as before so as to produce the same flow rate. As the gas issues from the outlet of each unit 1, it is monitored continuously and the recorders 15 give a plot of axial (longitudinal) distribution of neutron flux. Comparison between the readings of the various recorders 15 associated with the radially disposed units 1 gives the radial distribution of flux. After monitoring, the gas can be discharged to atmosphere as the amounts employed are small. Instead of employing a piston and cylinder, a gas supply cylinder 24, pressure reducing valve and pressure gauge unit 25 (see FIGURE 1) and an on-off valve (for stopping and re-starting gas flow) may be employed.

In an alternative procedure, employing apparatus shown diagrammatically in FIGURE 3, the motor 16 used for driving the recorder 15 of each detector 8 is also used to drive a tachogenerator 17 whose output is fed to another recorder 18 and also fed back to the amplifier 14 of the recorder 15. The recorder 18 associated with the tachogenerator 17 is used to indicate axial (longitudinal) distribution of flux on changing the flow rate of the gas in the respecitve unit 1, the recorder 18 then indicating the differential of the transitional readings. Change of flow rate can be effected by employing the assembly 10 shown in FIGURE 2 and comprising a compound piston in which a small piston 19 operating in a larger one 11 is first moved by means of piston rod 30 with constant speed until its end 20 registers with the end 21 of the larger piston 11 and then without pause the two pistons 19, 11 are moved together by piston rod 30, still at constant speed. As no "soak" time is provided by this alternative, it assumes that the neutron flux is high enough to give a useful signal on the recorder 18, and/or that the flow rates are small. An input 22 to the cylinder 12 and the cylinder 23 for the piston 19 is supplied with argon from a pressure cylinder 24 via a pressure reducing valve and pressure gauge unit 25 (see FIGURE 1).

The reason for providing coaxial pipes is to minimise the effect of rise in temperature of the gas as it passes through the core, the heated outflowing gas serving to preheat ingoing gas and be cooled itself in the process. If the effect of temperature rise be negligible in any given case, the flow path for the gas may be provided in each unit by a single tube passing through the core, and either returning outside the core or returning through the core for detection outside the high-flux region.

In an alternative or modified means for effecting change of flow rate, illustrated in FIGURE 4, the reactor core 2 is penetrated by a plurality, for example 21, of units 1 or alternatively by single tubes 31 as shown. A selector valve 32 at the outflow end of the tubes 31 is operated simultaneously by connection with a selector valve 33 at the inflow end of the tubes 31, the valve 32 leading to the monitor 8 and the valve 33 being supplied from a two-limb network having alternative connections operated by 2-way valves 34 and 35 interconnected for simultaneous operation. The limbs 40, 41 are similar and each comprises a pressure reducing valve 36, a variable restrictor 37 normally pre-set to a desired restriction, the restrictor 37 of one limb being set for a fast flow and the other for a slower flow, and a flow indicator 38. Each valve 34, 35 has a bleed-off to exhaust provided with a variable restrictor 39 capable of fine setting and serving to simulate the tubes 31 in respect of gas flow therethrough. On positon of the valves 34, 35 connects the selector valve 33 with the limb 40 whilst the limb 41 is connected to one bleed-off, whilst the other position connects the selector valve 33 to the limb 41 whilst the limb 40 is connected to the other bleed-off. The limbs 40, 41 are supplied with argon from a common supply cylinder 24 through a pressure reducing valve and pressure gauge unit 25.

The tubes 31 are calibrated for flow characteristics and the setting of the respective control restrictor 37 is charted for each tube 31 for an indicated flow at 38. Operation of the valves 34, 35 connects a tube 31 in turn with slow and fast supply of argon, pre-setting of the control 37 using the respective bleed-off being effected for the next of the tubes 31 to be used whilst the one being used is having argon passed through it.

I claim:
1. A method of measuring the distribution of flux in the core of a nuclear reactor comprising the successive steps of introducing a filament of an inert gas of high neutron capture cross-section into a small bore tube extending through the reactor core, irradiating the filament of the inert gas in the core for a period, subjecting the filament to a change in velocity, removing the filament from the core, and measuring the distribution of neutron flux along the length of the withdrawn filament of gas.

2. A method of measuring the distribution of flux in the core of a nuclear reactor as claimed in claim 1, wherein the filament of inert gas remains stationary in the core for said period.

3. A method of measuring the distribution of flux in the core of a nuclear reactor as claimed in claim 1, wherein the filament of inert gas moves with a constant velocity in the core during said period and is removed from the core at a velocity other than the said constant velocity.

4. Apparatus for measuring the distribution of flux in the core of a nuclear reactor comprising a small-bore tube extending through the core, means incorporating a compound piston to cause a filament of an inert gas of high neutron capture cross-section to flow through the tube at two different velocities, an activity recorder outside the core to measure the distribution of activity in the inert gas along the filament, and means to differentiate the measured distribution of activity to obtain the distribution of flux in the reactor core.

References Cited by the Examiner

UNITED STATES PATENTS

| | | | |
|---|---|---|---|
| 2,741,592 | 4/56 | Borst et al. | 176—22 |
| 2,751,505 | 6/56 | Anderson | 176—17 X |
| 2,863,062 | 12/58 | Sturm. | |
| 3,073,959 | 1/63 | Jervis | 176—26 X |

OTHER REFERENCES

Nuclear Power, December 1958, page 602.

CARL D. QUARFORTH, *Primary Examiner.*

ROGER L. CAMPBELL, *Examiner.*